United States Patent [19]

Uno

[11] Patent Number: 5,353,174

[45] Date of Patent: Oct. 4, 1994

[54] MOTOR SPEED SENSING SYSTEM FOR MAGNETIC DISK APPARATUS OR THE LIKE

[75] Inventor: Hisatoshi Uno, Tokyo, Japan

[73] Assignee: Teac Corporation, Tokyo, Japan

[21] Appl. No.: 668,773

[22] Filed: Mar. 13, 1991

[30] Foreign Application Priority Data

Mar. 19, 1990 [JP] Japan .................................. 2-68721

[51] Int. Cl.$^5$ .............................................. G11B 5/55
[52] U.S. Cl. ............................... 360/78.06; 360/78.11; 360/78.04
[58] Field of Search ............... 360/78.06, 78.07, 78.11, 360/78.13, 77.04, 78.04

[56] References Cited

U.S. PATENT DOCUMENTS

| | | | |
|---|---|---|---|
| 4,642,541 | 2/1987 | El-Sadi | 360/78.06 |
| 4,807,072 | 2/1989 | Ono et al. | 360/105 |
| 4,875,116 | 10/1989 | Yasuda et al. | 360/78.11 |
| 4,907,109 | 3/1990 | Senio | 360/77.04 |
| 5,128,812 | 7/1992 | Uno | 360/78.06 |

*Primary Examiner*—Timothy P. Callahan
*Attorney, Agent, or Firm*—Woodcock Washburn Kurtz Mackiewicz & Norris

[57] ABSTRACT

A motor speed control system is disclosed as adapted for the traveling speed control of a transducer on a pivotal support beam driven by a voice coil motor in a rotating disk data storage apparatus. The speed control system includes a speed sensor having a speed sensing coil for electromagnetically generating a motor speed signal representative of the actual traveling speed of the transducer. Since the speed sensing coil is of necessity disposed adjacent the drive coil of the voice coil motor, the motor speed signal contains a noise component due to the mutual induction between the two coils. For the elimination of the noise component from the motor speed signal, which is to be utilized for the feedback speed control of the voice coil motor, a differentiator circuit is provided for deriving a noise suppression signal, which is equivalent to the noise component, from a motor speed control signal representative of the desired traveling speed of the transducer. Both the motor speed signal and the noise suppression signal are directed to a differential amplifier whereby a is noise-free motor speed signal is obtained. A second differential amplifier inputs both this noise-free Motor speed signal and the motor speed control signal for providing an output proportional to the difference therebetween. This output is supplied to a motor driver circuit for driving the voice coil motor accordingly.

13 Claims, 5 Drawing Sheets (A) INPUT TO MOTOR DRIVER CIRCUIT 66

(B) DIFFERENTIATOR OUTPUT (C) SPEED SENSOR OUTPUT VOLTAGE (D) NOISE-FREE SPEED SENSOR OUTPUT

MOTOR SPEED SENSING SYSTEM FOR MAGNETIC DISK APPARATUS OR THE LIKE

BACKGROUND OF THE INVENTION

My invention relates to a system for sensing the speed of an electric motor such as a voice coil motor, and more specifically to a motor speed sensing system suitable for use in the feedback speed control of a transducer or transducers traveling from track to track in data storage and retrieval systems employing "fixed" or hard magnetic disks as record media, among other applications.

The voice coil motor represents one of the familiar means for positioning a transducer or electromagnetic head with respect to a multiplicity of annular, concentric data storage tracks on a hard magnetic disk. U.S. Pat. No. 4,807,072 to Ono et al., assigned to the assignee of the instant application, discloses a known example of transducer positioning system employing a voice coil motor.

In the above and other transducer positioning systems, the precise control of the traveling speed of the transducer is essential for the minimization of seek time, that is, the time required for transducer travel from a departure track to a destination track. U.S. Pat. No. 4,875,116 to Yasuda et al., also assigned to the assignee of the instant application, teaches the use of an optical encoder for sensing the speed of the voice coil motor. Optical encoders are, however, very expensive. A far less expensive motor speed sensor has therefore been generally employed, that is, that comprising a pair of permanent magnets and a speed sensing coil disposed opposite the magnets for reciprocating movement across their fields.

I object to the electromagnetic speed sensor as heretofore used for transducer position control purposes. The sensor must of necessity be disposed in the immediate proximity of the voice coil motor. This placement of the sensor has made it unavoidable for the speed sensing coil to generate an undesired voltage component for its mutual induction with the motor drive coil, in addition to the desired voltage proportional to the traveling speed of the transducer.

As far as I am aware, no truly satisfactory solution has yet been proposed for the elimination of the noise component from the electromagnetic speed sensor output. Any noise suppression means to be employed to this end must be capable of fully performing the function for which it is intended, but should not be so expensive that the total cost of the electromagnetic speed sensor and the noise suppression means will exceed, or even come close to, the cost of an optical encoder which might be adopted in place of the electromagnetic sensor without noise suppression means.

SUMMARY OF THE INVENTION

I have hereby invented how to cancel out the noise component from the output from an electromagnetic motor speed sensor by simple, inexpensive and thoroughly practicable means and hence to obtain a voltage signal truly representative of the motor speed.

Briefly, my invention may be summarized as a system for sensing the traveling speed of an object driven by an electric motor of the kind having a drive coil. The speed sensing system comprises a speed sensor having a speed sensing coil for electromagnetically generating a voltage proportional to the traveling speed of the object. The speed sensing coil is to be disposed in the vicinity of the drive coil of the motor so that the voltage generated by the speed sensing coil includes a noise component induced by the flow of an electric current through the drive coil. For the elimination of this noise component, there are provided a noise suppression signal generator circuit for generating a noise suppression signal equivalent to the noise component of the output voltage of the speed sensing coil, and a noise suppressor circuit connected to both the speed sensing coil and the noise suppression signal generator circuit for eliminating the noise component from the output voltage of the speed sensing coil by the noise suppression signal.

The noise suppression signal can be derived from a motor speed control signal supplied from motor speed control means to a motor driver circuit which is connected to the drive coil of the motor for controllably energizing the same. Preferably, the noise suppression signal generator circuit comprises a differentiator connected to the motor speed control means for inputting the motor speed control signal. The noise component of the output from the speed sensor corresponds to the drive current fed from the motor driver circuit to the motor drive coil, which drive current corresponds in turn to the motor speed control signal. The desired noise suppression signal equivalent to the noise component can therefore be easily derived from the motor speed control signal.

The above outlined speed sensing system of my invention lends itself to use for the feedback speed control of a transducer traveling across a multiplicity of annular, concentric data storage tracks on a magnetic disk in a data storage and retrieval apparatus. The transducer is mounted to a pivoted support beam driven directly by a voice coil motor.

In this application of my invention, the speed sensor including a speed sensing coil generates a motor speed signal representative of the actual traveling speed of the transducer. For the elimination of a noise component from this motor speed signal, which is to be utilized for the feedback speed control of the transducer, a noise suppression signal generator circuit comprising a differentiator is provided for supplying a noise suppression signal equivalent to the noise component. Both the motor speed signal and the noise suppression signal are directed to a differential amplifier whereby a noise-free motor speed signal, truly representative of the actual traveling speed of the transducer, is obtained. A second differential amplifier inputs both this noise-free motor speed signal and a motor speed control signal, representative of a desired traveling speed of the transducer, for providing an output proportional to the difference therebetween. This output is supplied to a motor driver circuit for driving the voice coil motor accordingly. The differentiator is connected to the second differential amplifier for deriving the noise suppression signal from the output therefrom.

Thus the traveling speed of the transducer during track seeking operation can be controlled highly accurately as the noise component of the motor speed signal is thoroughly removed before the motor speed signal is fed back for comparison with the motor speed control signal. It will also be appreciated that this noise removal is possible by the simple and expensive circuit means.

The above and other features and advantages of my invention and the manner of realizing them will become more apparent, and the invention itself will best be understood, from a study of the following description and appended claims, with reference had to the attached drawings showing some preferable embodiments of my invention.

DESCRIPTION OF THE PREFERRED EMBODIMENTS

Figure 1:
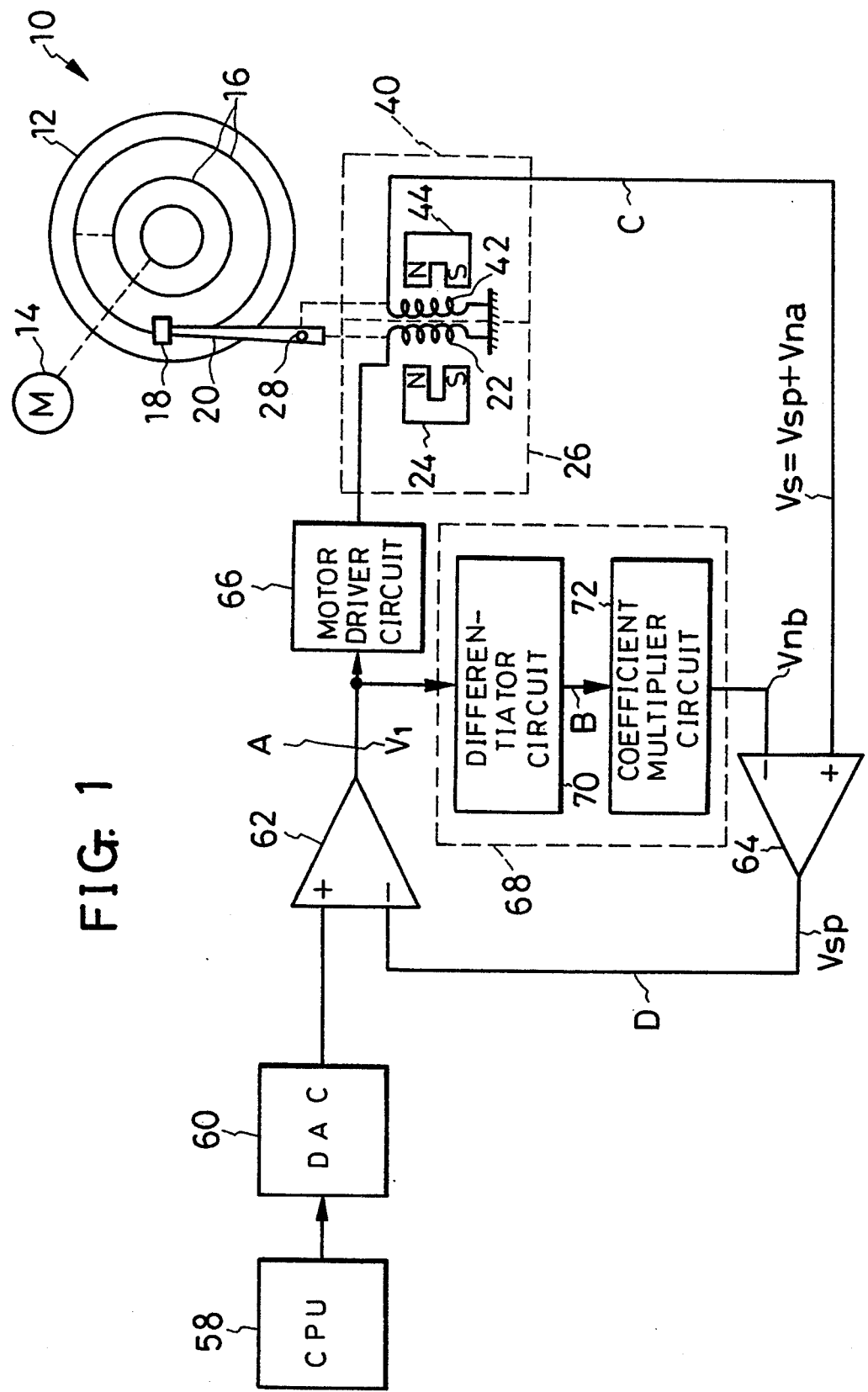
FIG. 1 is a block diagram of a rotating disk data storage and retrieval apparatus in which the motor speed control system of my invention is incorporated for the feedback speed control of a transducer traveling from track to track on the disk.

I will now describe the motor speed sensing system of my invention in detail in the environment of a hard disk drive illustrated diagrammatically in FIG. 1 and therein generally designated 10. Although the disk drive 10 is shown highly simplified and only to an extent necessary for the understanding of my invention, it will nevertheless be seen that it has a hard magnetic disk 12 coupled to, and driven directly by, a disk drive motor 14.

I assume for the convenience of disclosure that the disk 12 is single sided, having a multiplicity of annular data tracks 16 arranged concentrically on one side only. Thus only one electromagnetic transducer or head 18 is shown mounted to one end of a head support beam 20 for writing and reading data on the disk tracks 16.

The support beam 20 rigidly carries a moving coil 22 on its other end. The moving coil 22 in combination with field generating means 24 forms a voice coil motor 26 which is per se well known in the art and which is herein employed as an example of seek motor. Pivoted on a pivot pin 28, the support beam 20 is to be driven by the voice coil motor 26 for pivotal movement in a plane parallel to the surface of the disk 12, in order to position the transducer 18 on any desired one of the data tracks 16 on the disk.

Figure 2:
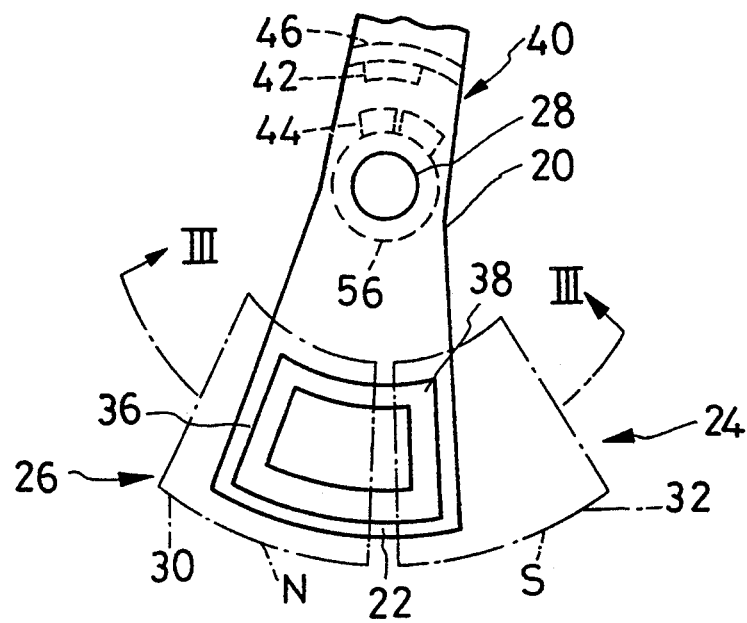
FIG. 2 is a fragmentary plan view of the transducer support beam in the FIG. 1 apparatus, the support beam being shown together with a voice coil motor driving the support beam and with an electromagnetic speed sensor for sensing the traveling speed of the transducer.
Figure 3:
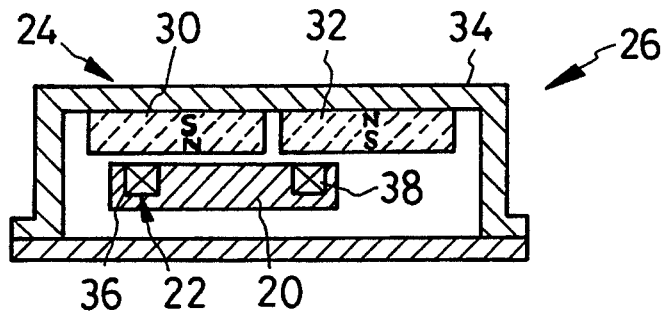
FIG. 3 is a section taken along the line III—III in FIG. 2 and showing the voice coil motor.

As illustrated in greater detail in FIGS. 2 and 3, the field generating means 24 of the voice coil motor 26 comprises a first 30 and a second 32 permanent magnet mounted to a yoke 34 and disposed side by side. The moving coil 22 is approximately rectangular in shape, as seen in a plan view as in FIG. 4, having a pair of opposite sides 36 and 38. The first magnet 30 is positioned to create a magnetic field that acts in one direction on the side 36 of the moving coil 22. The second magnet 32 is positioned to create another magnetic field that acts in the opposite direction on the side 38 of the moving coil 22.

Therefore, when controllably energized, the moving coil 22 will travel back and forth relative to the pair of magnets 30 and 32. Such back and forth travel of the moving coil 22 results in the bidirectional swinging movement of the support beam 22 and hence in the approximately linear travel of the transducer 18 across the data tracks 16 on the disk 12.

Figure 4:
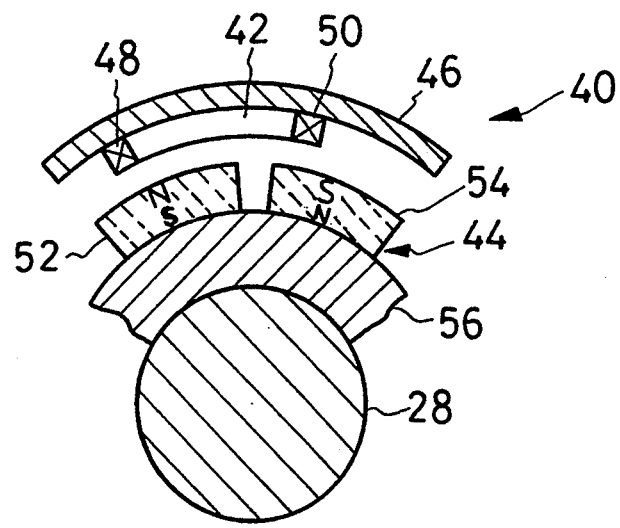
FIG. 4 is an enlarged, partial section through the showing of FIG. 2 and showing the speed sensor in particular.
Figure 5:
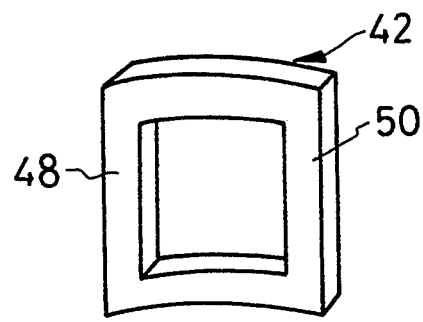
FIG. 5 is a perspective view of the coil of the speed sensor.

The reference numeral 40 in FIGS. 1, 2 and 4 generally denotes a speed sensor for sensing the traveling speed of the transducer 18 from the speed of the pivotal movement of the head support beam 20. Broadly, the speed sensor 40 comprises a sensing coil 42 and field generating means 44. Both FIGS. 2 and 4 indicate that the sensing coil 42 is affixed to a rib 46 formed on the support beam 20 in a position intermediate the transducer 18 and the pivot pin 28 but far closer to the pivot pin than to the transducer. The rib 46 as well as the sensing coil 42 attached thereto is arcuate in shape, as seen in a plan view as in FIGS. 2 and 4, and is centered about the axis of the pivot pin 28. As shown in perspective in FIG. 5, the sensing coil 42 is wound in the shape of a rectangle including a pair of opposite sides 48 and 50.

The field generating means 44 of the speed sensor 40 comprises a pair of permanent magnets 52 and 54 affixed to a sleeve bearing 56 around the pivot pin 28. The permanent magnets 52 and 54 are disposed side by side and generate magnetic fields of opposite orientations in which there are disposed the sides 48 and 50 of the sensing coil 42. Traversing these magnetic fields with the pivotal movement of the support beam 20, the sensing coil 42 will generate a voltage in proportion with the traveling speed of the transducer 18.

With reference back to FIG. 1 the hard disk drive 10 is provided with a microprocessor or central processor unit (CPU) 58. Among the functions of this CPU is the production of one set after another of digital speed data needed for transducer travel from any track 16 to any other on the disk 12. Each set of speed data is so determined that the transducer 18 will travel from any departure track to any destination track in a minimum of time. The CPU 58 has its output connected to a digital to analog converter (DAC) 60 whereby each set of digital speed data is translated into an analog equivalent.

A differential amplifier 62 has a first input connected to the DAC 60, and another input to a second differential amplifier 64. This second differential amplifier constitutes a noise suppressor circuit, functioning for the removal of noise from the output from the speed sensor 40, as will become apparent as the description proceeds. The first mentioned differential amplifier 62 has its output connected to a motor driver circuit 66 which in turn is connected to the moving coil 22 of the voice coil motor 26 for energizing the same as dictated by the speed data from the CPU 58.

Also connected to the output of the first differential amplifier 62 is a noise suppression signal generator circuit 68 which generates a noise suppression signal needed for noise removal from the speed sensor output by the second differential amplifier 64. The noise suppression signal generator circuit 68 is herein shown as a serial connection of a differentiator circuit 70 and a coefficient multiplier circuit 72. The differentiator circuit 70 has its input connected to the first differential amplifier 62. The coefficient multiplier circuit 72 has its output connected to the second differential amplifier 64.

The second differential amplifier 64 has its other input connected to the sensing coil 42 of the speed sensor 40. The noise suppression signal from the circuit 68 is equivalent to the noise component included in the output voltage of the sensing coil 42, so that the second differential amplifier 64 puts out a noise-free speed signal representative of the actual traveling speed of the transducer 18, or of the actual speed of rotation of the voice coil motor 26. This noise-free speed signal is delivered to the first differential amplifier 62.

Figure 6:
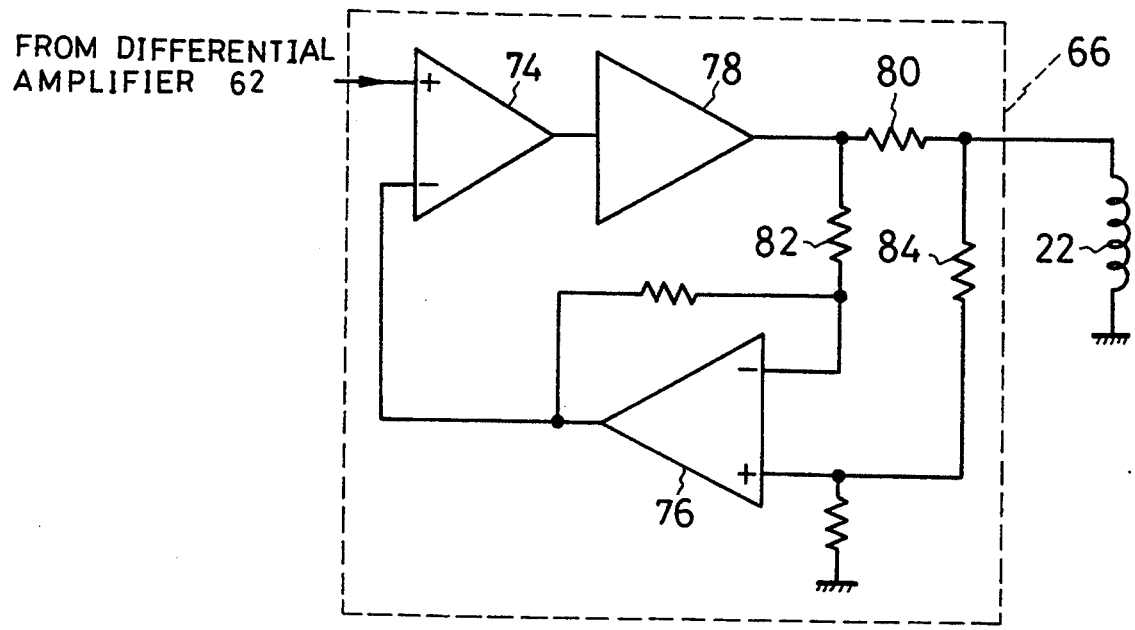
FIG. 6 is a block diagram showing the motor driver circuit of the FIG. 1 apparatus in more detail.

FIG. 6 is a more detailed representation of the motor driver circuit 66 connected between first differential amplifier 62 and voice coil motor 26. In order to energize the voice coil motor with a current proportional with the output voltage of the first differential amplifier 62, the motor driver circuit 66 comprises two differential amplifiers 74 and 76, a driver amplifier 78 and resistors 80, 82 and 84.

The differential amplifier 74 has its two inputs connected respectively to the first differential amplifier 62 and to the feedback differential amplifier 76. The output of the differential amplifier 74 is connected to the driver amplifier 78, which in turn is connected to the voice coil motor coil 22 via the resistor 80. Both extremities of this resistor 80 are separately connected to the two inputs of the feedback differential amplifier 76 via the resistors 82 and 84, respectively. Thus the differential amplifier 76 will feed back to the differential amplifier 74 a voltage corresponding to the current flowing through the resistor 80. Accordingly, the motor driver circuit 66 will provide an output current corresponding to its input voltage.

Figure 7:
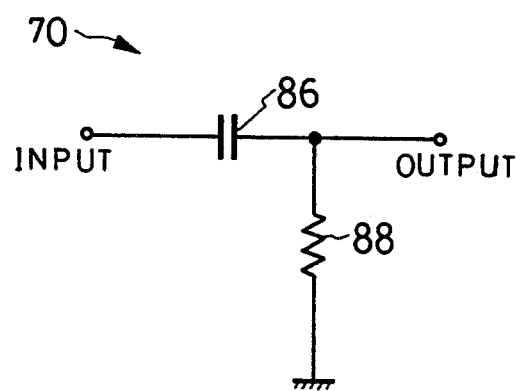
FIG. 7 is a schematic electrical diagram showing the differentiator circuit of the FIG. 1 apparatus in more detail.

FIG. 7 shows an example of differentiator circuit 70, FIG. 1, included in the noise suppression signal generator circuit 68. The exemplified differentiator circuit 70 is of familiar construction comprising a capacitor 86 and a resistor 88.

OPERATION

I will now proceed to the description of operation of the motor speed control system constructed as in the foregoing. In the course of such operational description I will refer to the FIG. 8 which allows at (A) trough (D) the signal waveforms appearing at various parts of the FIG. 1 circuitry. Therefore, in FIG. 1, I have indicated by the same capitals A–D the parts where the corresponding waveforms (A)–(D) of FIG. 8 appear.

Figure 8:
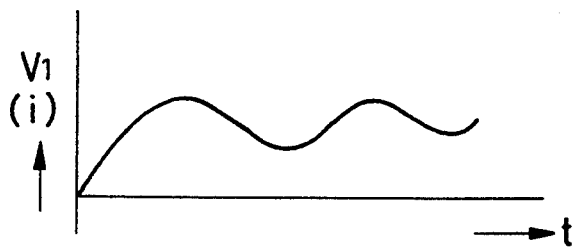
FIG. 8, consisting of (A)-(D), is a set of waveform diagrams useful in explaining the operation of the FIG. 1 apparatus.
Figure 8:
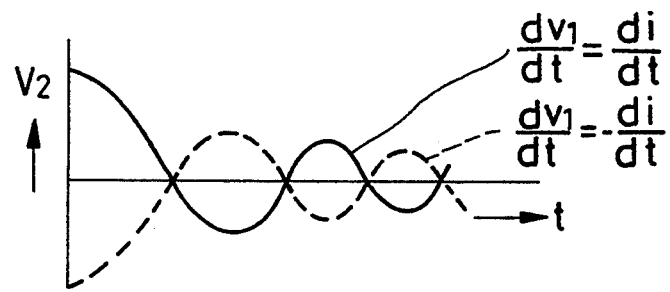
Figure 8:
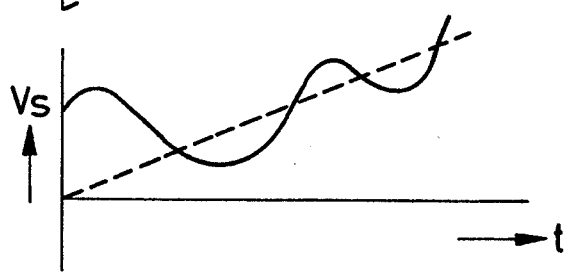
Figure 8:
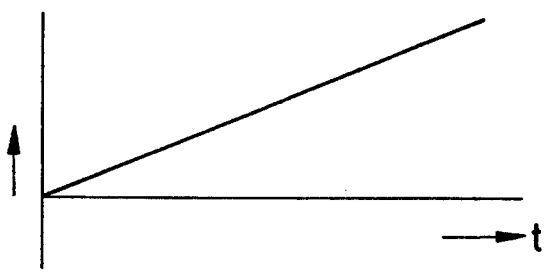

At (A) in FIG. 8 is shown the output voltage $V_1$ of the first differential amplifier 62, or the input voltage of the motor driver circuit 66. This voltage $V_1$ represents the difference between the desired transducer or motor speed voltage output of the DAC 60 and the noise-free actual transducer or motor speed voltage output of the second differential amplifier 64. In response to this input voltage the motor driver circuit 66 will energize the moving coil 22 of the voice coil motor 25 with a current i corresponding to the input voltage $V_1$, as has been explained with reference to FIG. 6.

As the moving coil 22 travels at a speed dictated by the CPU 58, so will the sensing coil 42 of the speed sensor 40 relative to the pair of permanent magnets 52 and 54. Thus, as shown in FIG. 8(C), the speed sensing coil 42 will develop a voltage $V_s$. As has been pointed out in conjunction with the prior art, this voltage $V_s$ will contain both a component $V_{sp}$ truly representative of the traveling speed of the transducer 18 and a noise component $V_{na}$ due to the mutual induction between voice coil motor coil 22 and speed sensing coil 42. Hence $$V_s = V_{sp} + V_{na}.$$

The noise component $V_{na}$ can be defined as $$V_{na} = M\, di/dt$$

where
  i = drive current,
  t = time, and
  M = coefficient of mutual induction between the coils 22 and 42.

The speed sensor output voltage $V_s$ will vary with time as indicated by way of example by the solid line in FIG. 8(C) if, as is unavoidable in the case under consideration, it contains the noise component $V_{na}$. If it did not contain the noise component $V_{na}$, on the other hand, then the speed sensor output voltage $V_s$ would be as indicated by the broken line in FIG. 8(C). It is this broken line curve that is desired for the feedback speed control of the voice coil motor 26.

The output voltage $V_1$ of the first differential amplifier 62 is directed to the differentiator circuit 70 of the noise suppression signal generator circuit 68, besides being fed to the motor driver circuit 66. The resulting output $V_2$ from the differentiator circuit 70 will be as indicated by the solid line in FIG. 8(B). This differentiator output voltage $V_2$ is equivalent to di/dt.

The coefficient multiplier circuit 72, the other component of the noise suppression signal generator circuit 68, multiplies the differentiator output voltage $V_2$ by a coefficient corresponding to the coefficient M of mutual induction between the coils 22 and 42. The resulting output $V_{nb}$ from the coefficient multiplier circuit 72 will be as indicated by the broken line in FIG. 8(B).

Thus the second differential amplifier 64 subtracts the noise suppressor output $V_{nb}$ from the speed sensor output $V_s(=V_{sp}+V_{na})$ and puts out the noise-free speed signal diagramed in FIG. 8(D). Since $V_{nb}$ can be made to closely approximate $V_{na}$, the output from the second differential amplifier 64 will equal that voltage component $V_{sp}$ of the speed sensor output $V_s$ which truly represents the traveling speed of the transducer 18, or the speed of rotation of the voice coil motor 26.

Second Form

Figure 9:
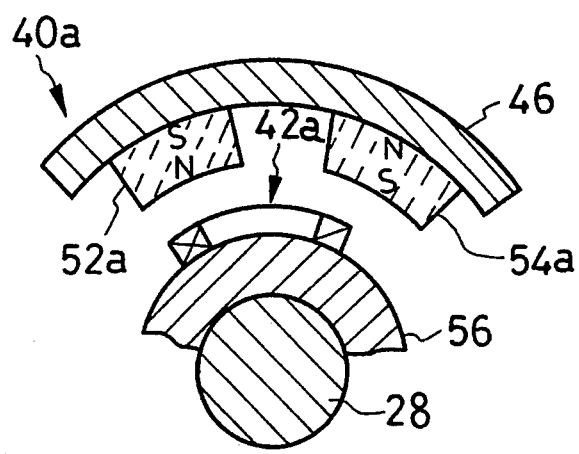
FIG. 9 is a view similar to FIG. 4 but showing an alternate speed sensor for use in the FIG. 1 apparatus.

The speed sensor 40 shown in FIGS. 2 and 4 may be modified as shown in FIG. 9. The modified speed sensor $40_a$ has a pair of permanent magnets $52_a$ and $54_a$ mounted to the rib 46 on the head support beam, not shown here, and a coil $42_a$ mounted to the sleeve bearing 56 around the pivot pin 28. The relative positions of the magnets $52_a$ and $54_a$ and the coil $42_a$ in the modified speed sensor $40_a$ are essentially equivalent to those in the first disclosed speed sensor 40, all that is required being that a relative motion take place between the magnets and the coil with the pivotal movement of the head support beam.

Third Form

Figure 10:
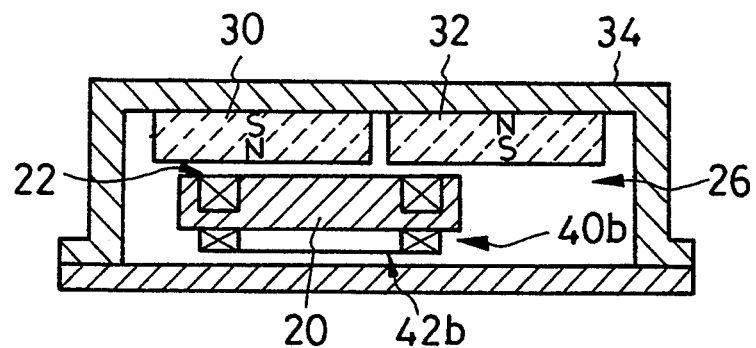
FIG. 10 is a view similar to FIG. 3 but showing another alternate speed sensor for use in the FIG. 1 apparatus, the second alternate speed sensor sharing magnet means with the voice coil motor.

FIG. 10 shows another modification of the speed sensor 40. The second modified speed sensor 40$_b$ has a coil 42$_b$ mounted to the head support beam 20 in concentric relation to the coil 22 of the voice coil motor 26. Thus, in this second alternate embodiment, the voice coil motor 26 and the speed sensor 40 share the pair of permanent magnets 30 and 32 mounted to the yoke 34.

Possible Modifications

Although I have shown and described the speed sensing system of my invention in conjunction with a voice coil motor in a hard disk drive, I do not wish my invention to be limited to this particular application as my invention finds a variety of other applications where electric motors of not necessarily the voice coil type may be employed.

Moreover, the above disclosed embodiments of my invention are themselves subject to a variety of modifications or alterations within the broad teaching hereof. For instance, in the coefficient multiplier circuit 70 shown in FIG. 1, a negative coefficient may be employed to provide an output of negative polarity corresponding to the differentiator output indicated by the broken line in FIG. 8(B). This negative output may be added to the speed sensor output V$_s$, by substituting an adder for the differential amplifier 64 of FIG. 1. As another possible modification of the FIG. 1 circuitry, an amplifier may be connected between speed sensor 40 and differential amplifier 64.

What I claim is:

1. A system for sensing the traveling speed of an object driven by an electric motor of the kind having a drive coil, the system comprising:
    (a) a speed sensor comprising a speed sensing coil for electromagnetically generating a voltage proportional to the traveling speed of the object, the speed sensing coil being disposed in the vicinity of and magnetically coupled to the drive coil of the motor so that the voltage generated by the speed sensing coil includes a noise component induced by the flow of an electric current through the drive coil;
    (b) a noise suppression signal generator circuit for generating a noise suppression signal equivalent to the noise component of the output voltage of the speed sensing coil; and
    (c) a noise suppressor circuit connected to both the speed sensing coil and the noise suppression signal generator circuit for eliminating the noise component from the output voltage of the speed sensing coil by the noise suppression signal.

2. The speed sensing system of claim 1 wherein the drive coil of the electric motor is energized by a driver circuit under the control of a speed control signal supplied by motor speed control means, and wherein the noise suppression signal generator circuit comprises a differentiator circuit connected to the motor speed control means for deriving the noise suppression signal from the speed control signal.

3. The speed sensing system of claim 2 wherein the noise suppressor circuit comprises a differential amplifier having a first input connected to the speed sensing coil and a second input connected to the differentiator circuit.

4. A system for sensing the traveling speed of an object driven by an electric motor of the kind having a drive coil to be energized by a driver circuit under the control of a motor speed control signal supplied by motor speed control means, the system comprising:
    (a) a speed sensor comprising a speed sensing coil for electromagnetically generating a voltage proportional to the traveling speed of the object, the speed sensing coil being disposed in the vicinity of and magnetically coupled to the drive coil of the motor so that the voltage generated by the speed sensing coil includes a noise component induced by the flow of an electric current through the drive coil;
    (b) a noise suppression signal generator circuit connected to the motor speed control means for deriving from the motor speed control signal a noise suppression signal equivalent to the noise component of the output voltage of the speed sensing coil; and
    (c) a noise suppressor circuit connected to both the speed sensing coil and the noise suppression signal generator circuit for eliminating the noise component from the output voltage of the speed sensing coil by the noise suppression signal.

5. The speed sensing system of claim 4 wherein the noise suppression signal generator circuit comprises a differentiator circuit.

6. The speed sensing system of claim 5 wherein the noise suppressor circuit comprises a differential amplifier having a first input connected to the speed sensing coil and a second input connected to the differentiator circuit.

7. The speed sensing system of claim 4 wherein the speed sensing coil of the speed sensor is mounted to the motor driven object, and wherein the speed sensor further comprises permanent magnet means mounted to a stationary part relative to which the object is movable.

8. The speed sensing system of claim 4 wherein the speed sensing coil of the speed sensor is mounted to a stationary part relative to which the motor driven object is movable, and wherein the speed sensor further comprises permanent magnet means mounted to the motor driven object.

9. A system for sensing the traveling speed of an object driven by an electric motor of the kind having a drive coil disposed in the vicinity of magnetic field generating means, the drive coil being energized by a driver circuit under the control of a motor speed control signal supplied by motor speed control means, the system comprising:
    (a) a speed sensing coil mounted to the motor driven object for joint movement therewith and disposed in the vicinity of and magnetically coupled to the field generating means of the motor for electromagnetically generating a voltage proportional to the traveling speed of the object, the speed sensing means being also to be disposed in the vicinity of the drive coil of the motor so that the voltage generated by the speed sensing coil includes a noise component induced by the flow of an electric current through the drive coil;
    (b) a noise suppression signal generator circuit to be connected to the motor speed control means for deriving from the motor speed control signal a noise suppression signal equivalent to the noise component of the output voltage of the speed sensing coil; and
    (c) a noise suppressor circuit connected to both the speed sensing coil and the noise suppression signal generator circuit for eliminating the noise component from the output voltage of the speed sensing coil by the noise suppression signal.

10. In an apparatus having a transducer mounted to a pivoted support beam for data transfer with a rotating disklike record medium having a multiplicity of annular data storage tracks arranged concentrically thereon, and a seek motor of the kind having a drive coil for driving the support beam in order to move the transducer from track to track on the record medium, a system for controlling the traveling speed of the transducer across the tracks on the record medium, comprising:

(a) motor speed control means for providing a motor speed control signal representative of a desired traveling speed of the transducer;

(b) a speed sensor comprising a speed sensing coil for electromagnetically generating a motor speed signal representative of the actual traveling speed of the transducer, the speed sensing coil being to be disposed in the vicinity of the drive coil of the seek motor so that the motor speed signal includes a noise component induced by the flow of an electric current through the drive coil;

(c) a differentiator circuit for providing a noise suppression signal equivalent to the noise component of the motor speed signal;

(d) first differential amplifier having a first input connected to the speed sensor and a second input connected to the differentiator circuit for removing the noise component from the motor speed signal by the noise suppression signal;

(e) a second differential amplifier having a first input connected to the motor speed control means and a second input connected to the first differential amplifier for providing an output corresponding to the difference between the motor speed control signal and the noise-free motor speed signal; and (f) a driver circuit connected between the second differential amplifier and the seek motor for driving the latter as dictated by the output from the former;

(g) the differentiator circuit being connected to the second differential amplifier for deriving the noise suppression signal from the output therefrom.

11. The speed control system of claim 10 wherein the speed sensing coil of the speed sensor is mounted to the support beam, and wherein the speed sensor further comprises permanent magnet means mounted to a stationary part of the apparatus relative to which the support beam is movable.

12. The speed control system of claim 10 wherein the speed sensing coil of the speed sensor is mounted to a stationary part of the apparatus relative to which the support beam is movable, and wherein the speed sensor further comprises permanent magnet means mounted to the support beam.

13. The speed control system of claim 10 wherein the drive coil of the seek motor is mounted to the support beam for joint movement therewith relative to permanent magnet means included in the seek motor, and wherein the speed sensing coil of the speed sensor is also mounted to the support beam for joint movement therewith and disposed in the vicinity of the permanent magnet means for generating the voltage proportional to the traveling speed of the transducer in coaction with the permanent magnet means.

* * * * *